(12) United States Patent
Kobayashi et al.

(10) Patent No.: US 6,840,304 B1
(45) Date of Patent: Jan. 11, 2005

(54) EVAPORATOR, A HEAT ABSORBER, A THERMAL TRANSPORT SYSTEM AND A THERMAL TRANSPORT METHOD

(75) Inventors: Takashi Kobayashi, Tokyo (JP); Tetsuro Ogushi, Tokyo (JP); Atsushi Tsujimori, Tokyo (JP); Yoshihiro Kamoya, Tokyo (JP)

(73) Assignee: Mitsubishi Denki Kabushiki Kaisha, Chiyoda-ku (JP)

( * ) Notice: Subject to any disclaimer, the term of this patent is extended or adjusted under 35 U.S.C. 154(b) by 0 days.

(21) Appl. No.: 09/348,816

(22) Filed: Jul. 8, 1999

(30) Foreign Application Priority Data

Feb. 19, 1999 (JP) ............................................ 11-040956

(51) Int. Cl.$^7$ .............................................. F28D 15/02
(52) U.S. Cl. ................................ 165/11.1; 165/104.25; 165/104.26; 165/104.32; 165/104.33
(58) Field of Search .......................... 165/11.1, 104.23, 165/104.25, 104.26, 104.33, 104.21

(56) References Cited

U.S. PATENT DOCUMENTS

| | | | | |
|---|---|---|---|---|
| 3,677,336 A | * | 7/1972 | Moore, Jr. ......... | 165/104.26 X |
| 4,470,450 A | * | 9/1984 | Bizzell et al. ...... | 165/104.26 X |
| 4,576,009 A | | 3/1986 | Ogushi et al. | |
| 4,664,177 A | * | 5/1987 | Edelstein ........... | 165/104.26 X |
| 4,869,313 A | * | 9/1989 | Fredley ............. | 165/104.26 X |
| 4,890,668 A | * | 1/1990 | Cima ................ | 165/104.26 X |
| 4,903,761 A | * | 2/1990 | Cima ................ | 165/104.26 X |
| 4,957,157 A | * | 9/1990 | Dowdy et al. ...... | 165/104.26 X |
| 5,036,905 A | * | 8/1991 | Eninger et al. ..... | 165/104.26 X |
| 5,103,897 A | * | 4/1992 | Cullimore et al. .. | 165/104.26 X |
| 5,203,399 A | | 4/1993 | Koizumi | |
| 5,816,313 A | * | 10/1998 | Baker ............... | 165/104.23 X |
| 5,842,513 A | * | 12/1998 | Maciaszek et al. .... | 165/104.26 |
| 5,944,092 A | * | 8/1999 | Van Oost ............ | 165/104.26 |
| 6,058,711 A | * | 5/2000 | Maciaszek et al. . | 165/104.26 X |

FOREIGN PATENT DOCUMENTS

| | | | | |
|---|---|---|---|---|
| SU | 1395927 | * | 5/1988 | ............ 165/104.26 |
| SU | 1430709 | * | 10/1988 | ............ 165/104.26 |

OTHER PUBLICATIONS

Kotlyarov, E.Y., et al., "Methods of Increase of the Evaporators Reliability for Loop Heat Pipes and Capillary Pumped Loops", SAE International, 24$^{th}$ International Conference on Environmental Systems and 5$^{th}$ European Symposium on Space Environmental Control Systems, Friedrichshafen, Germany, Jun. 20–23, 1994, pps 1–13.

Ku, J. "Overview of Capillary Pumped Loop Technology", ASME—Heat Pipes and Capillary Pumped Loops, HTD, vol. 236, 1993, pps. 1–17.

* cited by examiner

*Primary Examiner*—Allen J. Flanigan
(74) *Attorney, Agent, or Firm*—Burns, Doane, Swecker & Mathis, L.L.P.

(57) ABSTRACT

The conventional thermal transport system has disadvantages of the configuration being complex, large, heavyweight and expensive. In the present invention, a plurality of evaporators are connected in series via the liquid flow line, the evaporator of the first position is connected to the condenser via the liquid supply line, the evaporator of the last position is connected to the reservoir tanks for adjusting the amount of the liquid. The liquid amount measuring sensor is installed to measure the amount of the liquid in the liquid reservoir of the evaporator. Based on the measured result of the liquid amount measuring sensor, the control valve operates so as to supply the liquid accommodated in the reservoir tanks to each evaporator.

23 Claims, 11 Drawing Sheets

EVAPORATOR, A HEAT ABSORBER, A THERMAL TRANSPORT SYSTEM AND A THERMAL TRANSPORT METHOD

BACKGROUND OF THE INVENTION

1. Field of the Invention

The present invention relates to an evaporator, a heat absorber and a thermal transport system.

2. Description of the Related Art

Thermal transport systems such as CPL (Capillary Pumped Loop) and LHP (Looped Heat Pipe) are commonly used in various applications like spacecraft, industrial machinery and home apparatus.

Since an evaporator of these thermal transport systems has a very narrow and thin structure therefore multi-connection of the evaporators is required to cover a wide range of heat generation area or distributed heat generation areas.

In this respect, previously, a parallel connection of CPL evaporators is adopted as shown in FIG. 11.

However, the parallel connection has disadvantages that: 1) liquid-phase working fluid in each evaporator dries out quickly, because it is difficult to equalize a liquid supply to each evaporator; and 2) pressure control within a loop is difficult.

Therefore, a conventional system is supported by an external pump for equalizing the liquid supply and an extra liquid reservoir tank attaching a heater for adjusting liquid pressure. However such additional components caused complicated, large and heavyweight configuration and high manufacturing cost.

Description of the numbered components follows: an evaporator 1 for receiving heat generated at a heat generation unit (not illustrated), a vapor line 5 where working fluid vaporized at the evaporator 1 (hereafter also called "vapor") flows, a condenser 7 for rejecting the heat, a liquid supply line 8 where working fluid condensed at the condenser 7 (hereunder also called "liquid") flows, an arrow 20 showing a direction of vapor flow in the vapor line 5, an arrow 21 showing a direction of liquid flow, a board 26 incorporating the heat generation unit, an extra liquid reservoir 41, a heater 42, a by-pass valve 43, and a pump 44.

Within a loop formed by the vapor line 5, the condenser 7, and the liquid supply line 8, an uncolored portion shows the vapor flows, and a black portion shows the liquid flows.

Next a function of the conventional thermal transport system is explained.

The evaporator 1 installs the porous structured wick at its inner wall. Liquid-phase working fluid in the evaporator 1 penetrates the wick by the effect of a capillary force of the wick.

The heat from the heat generation unit vaporizes the liquid penetrating the wick, and the vapor moves from the evaporator 1 to the vapor line 5. Soon, the vapor is cooled down and condensed at the condenser 7. The liquid condensed at the condenser 7 returns to the evaporator 1 via the liquid supply line 8 and the by-pass valve 43.

The liquid returns to the evaporator 1 by the action of the capillary force of the wick, however the capillary force of the wick is limited. When an amount of heat generated in the system increases, or in other words, when a heating value becomes high, the capillary force of the wick by itself cannot return the liquid to the evaporator 1. Consequently, the liquid supply to each liquid reservoir in the evaporator 1 stops and the liquid reservoir 1 dries out.

In order to prevent this problem, the conventional system adopts an external pump 44 so as to assist the capillary force of the wick.

In this case, the by-pass valve 43 is closed in order for the liquid to flow into the channel where the pump is. But a certain amount of the liquid goes to the by-pass valve 43 and remains stagnant about the by-pass valve 43, therefore a distribution of the liquid in the system changes.

In addition, the conventional system uses the extra liquid reservoir 41 attaching the heater 42 so as to secure adequate liquid supply to each evaporator 1.

The heater 42 raises the temperature in the extra liquid reservoir 41 to raise a pressure in the extra liquid reservoir 41. This raised pressure allows the liquid in the extra liquid reservoir to flow out.

As mentioned above, as the parallel connection of the evaporators 1 needs the pump and other devices, the configuration of the system has to be complicated and large.

The reason why the pumps and other components are required is that the capillary force of the wick itself is insufficient.

FLHP (Flexible Looped Heat Pipe) has a higher maximum heat transport capability and a longer transport distance than the conventional heat devices of CPL or a rigid heat pipe, therefore FLHP is expected to be a promising heat transport device for space satellites, electronics and so on.

As an evaporator 1 of FLHP also has a narrow shape like other heat transport devices, multi-connection of the FLHP evaporators 1 is required in cases of covering a wide range of heat generating area or distributed heat generation areas.

But the multi-connection of FLHP evaporators 1 had never been demonstrated.

Hence, multi-connection technique applied to FLHP has been desired.

As explained, the parallel connection of the evaporators has the disadvantages of the configuration being complex, large, heavyweight and expensive.

Therefore, the present invention aims to resolve such disadvantages and to introduce an evaporator, a heat absorber and a thermal transport system of simple, small, lightweight and cost effective structure.

SUMMARY OF THE INVENTION

According to one aspect of the present invention, an evaporator for receiving heat generated at heat generation unit comprises a) a liquid reservoir for accommodating liquid-phase working fluid;
b) a liquid supply port for supplying liquid-phase working fluid to the liquid reservoir;
c) a vapor ejection port for ejecting from the evaporator, working fluid vaporized at the evaporator; and
d) a liquid ejection port for ejecting from the evaporator, liquid-phase working fluid accommodated in the liquid reservoir.

According to another aspect of the present invention, a thermal transport system comprising an evaporator for receiving heat generated at a heat generation unit, and the evaporator comprises a) a liquid reservoir for accommodating liquid-phase working fluid;
b) a liquid supply port for supplying liquid-phase working fluid to the liquid reservoir;
c) a vapor ejection port for ejecting from the evaporator, working fluid vaporized at the evaporator; and
d) a liquid ejection port for ejecting from the evaporator, liquid-phase working fluid accommodated in the liquid reservoir.

According to another aspect of the present invention, the thermal transport system further comprises a reservoir tank for adjusting an amount of the liquid-phase working fluid, and the liquid ejection port is connected to the reservoir tank.

According to another aspect of the present invention, the thermal transport system comprises
a) a liquid amount measuring sensor for measuring an amount of the liquid-phase working fluid accommodated in the liquid reservoir; and
b) a liquid amount controller for controlling by using the reservoir tank, the amount of the liquid-phase working fluid accommodated in the liquid reservoir based on a measured data of the liquid amount measuring sensor.

According to another aspect of the present invention, the liquid amount measuring sensor is one of a temperature sensor and a pressure sensor.

According to another aspect of the present invention, a heat absorber comprises a plurality of evaporators serially connected in different positions for receiving heat generated at heat generation units, and each evaporator comprises:
a) a liquid reservoir for accommodating liquid-phase working fluid;
b) a liquid supply port for supplying liquid-phase working fluid to the liquid reservoir;
c) a vapor ejection port for ejecting from the evaporator, working fluid vaporized at the evaporator; and
d) a liquid ejection port for ejecting from the evaporator, liquid-phase working fluid accommodated in the liquid reservoir.

According to another aspect of the present invention, the liquid ejection port of the evaporator excluding the evaporator of the last position is connected to the liquid supply port of the evaporator of the next position, According to another aspect of the present invention, the heat absorber further comprises a reservoir tank for adjusting an amount of liquid-phase working fluid, and the liquid ejection port of the evaporator of the last position is connected to the reservoir tank.

According to another aspect of the present invention, a capacity of the liquid reservoir of the evaporator of the last position is larger than a capacity of the liquid reservoir of the evaporator of other positions.

According to another aspect of the present invention, the heat absorber comprises
a) a liquid amount measuring sensor for measuring an amount of liquid-phase working fluid accommodated in the liquid reservoir of an evaporator out of the plurality of evaporators; and
b) a liquid amount controller for controlling by using the reservoir tank the amount of the liquid-phase working fluid accommodated in the liquid reservoir of each evaporator based on measured data of the liquid amount measuring sensor.

According to another aspect of the present invention, the liquid amount measuring sensor measures the amount of liquid-phase working fluid accommodated in the liquid reservoir of the evaporator of the last position only, and the liquid amount controller controls by using the reservoir tank, the amount of the liquid-phase working fluid accommodated in the liquid reservoir of each evaporator based on one single measured data of the liquid amount measuring sensor.

According to another aspect of the present invention, the liquid amount measuring sensor measures the amount of liquid-phase working fluid accommodated in the liquid reservoirs of the plurality of evaporators of plural positions, and the liquid amount controller controls by using the reservoir tank, the amount of the liquid-phase working fluid accommodated in the liquid reservoir of each evaporator based on a plurality of measured data of the liquid amount measuring sensor.

According to another aspect of the present invention, the reservoir tank has a plurality of tanks of various size of capacity, and the liquid amount controller controls by using a tank out of the plurality of tanks, the amount of the liquid-phase working fluid accommodated in the liquid reservoir of each evaporator based on measured data of the liquid amount measuring sensor.

According to another aspect of the present invention, a thermal transport system comprises a plurality of evaporators serially connected in different positions for receiving heat generated at heat generation units and a condenser for rejecting heat, and each evaporator comprises
a) a liquid reservoir for accommodating liquid-phase working fluid;
b) a liquid supply port for supplying liquid-phase working fluid to the liquid reservoir;
c) a vapor ejection port for ejecting from the evaporator, working fluid vaporized at the evaporator; and
d) a liquid ejection port for ejecting from the evaporator, liquid-phase working fluid accommodated in the liquid reservoir.

According to another aspect of the present invention, the thermal transport system further comprises a reservoir tank for adjusting an amount of liquid-phase working fluid, and the liquid ejection port of the evaporator of the last position is connected to the reservoir tank.

According to another aspect of the present invention, the thermal transport system comprises
a) a liquid amount measuring sensor for measuring an amount of liquid-phase working fluid accommodated in the liquid reservoir of an evaporator out of the plurality of evaporators; and
b) a liquid amount controller for controlling by using the reservoir tank, the amount of liquid-phase working fluid accommodated in the liquid reservoir of each evaporator based on measured data of the liquid amount measuring sensor.

According to another aspect of the present invention, each evaporator further comprises a vapor line for supplying vapor vaporized at each evaporator to the condenser, and one vapor line meets with the other vapor lines at acute angle.

According to another aspect of the present invention, each evaporator further comprises a vapor line for supplying vapor vaporized at each evaporator to the condenser, and a bore size of the vapor line is widen as one vapor line meets the other vapor lines.

According to another aspect of the present invention, a thermal transport method using an evaporator for receiving heat generated at a heat generation unit, comprises steps of:
a) supplying liquid-phase working fluid to the evaporator;
b) accommodating in the evaporator, liquid-phase working fluid supplied to the evaporator by the supplying step;
c) ejecting from the evaporator, working fluid vaporized at the evaporator; and
d) ejecting from the evaporator, liquid-phase working fluid supplied to the evaporator by the supplying step and accommodated in the evaporator by the accommodating step.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention, and wherein.

DETAILED DESCRIPTION OF THE PREFERRED EMOBODIMENTS

Hereunder, preferred embodiments of the present invention will be described with reference to attached drawings.

Following embodiments refer to systems installing FLHP as one of the examples, it is also possible to adopt other heat transport devices such as CPL.

Embodiment 1.

Figure 1:
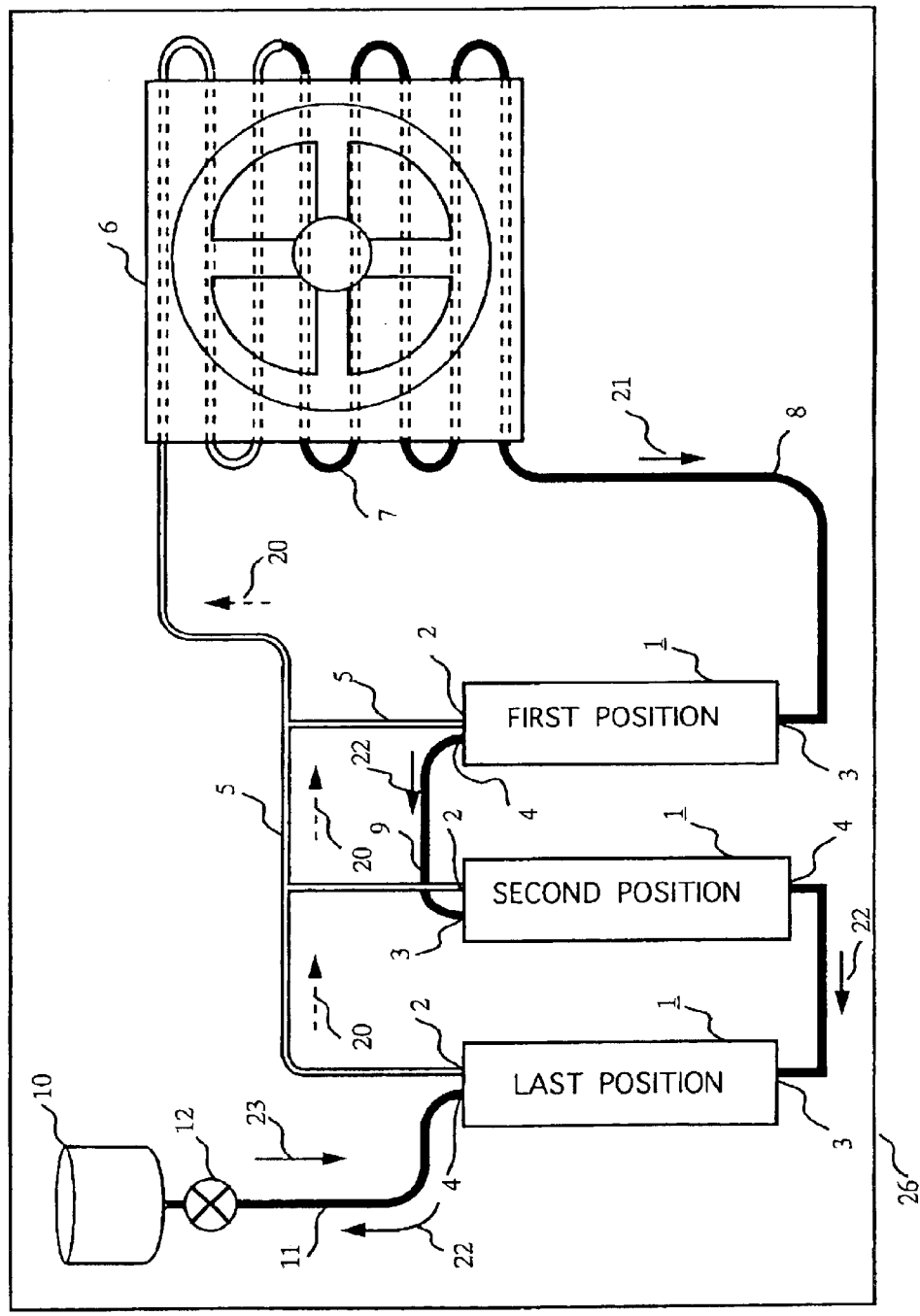
FIG. 1 shows a configuration of the thermal transport system of the present invention.
Figure 2:
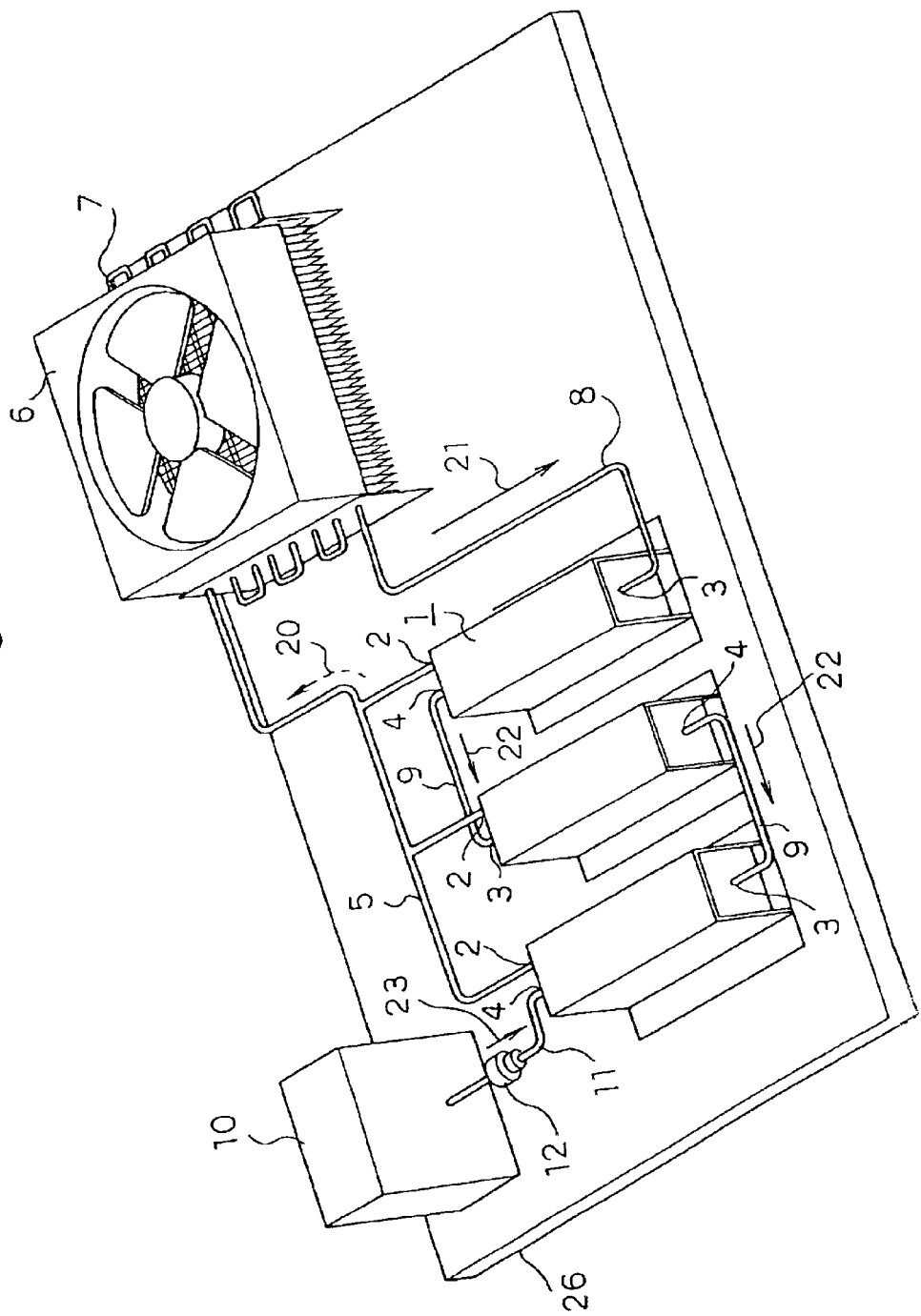
FIG. 2 shows a perspective view of the thermal transport system of the present invention.

FIG. 1 is a schematic view of the thermal transport system of the present invention. FIG. 2 is a perspective view of the system.

Figure 11:
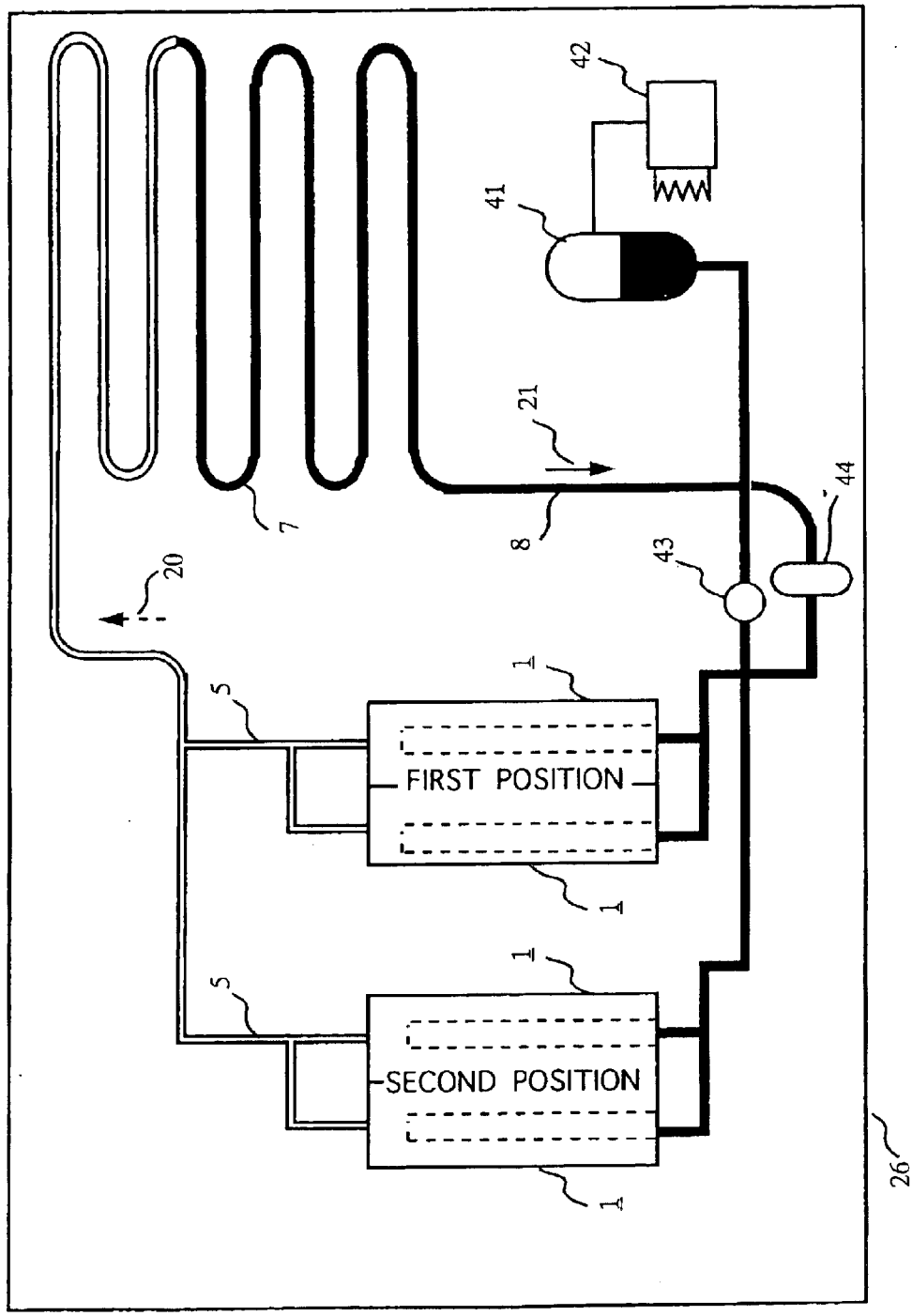
FIG. 11 shows a configuration of the conventional thermal transport system.

Components 1,5,7,8,20,21 and 22 in FIG. 1 are same as those in FIG. 11.

Description of the numbered components in FIG. 1 and FIG. 2 follows: a vapor ejection port 2 for ejecting the vaporized working fluid (hereunder also called "vapor") from the evaporator, a liquid supply port 3 for supplying the liquid to the evaporators 1, a liquid ejection port 4 for ejecting the liquid to the evaporator of the next position, a heat rejecting fan 6, a liquid flow line 9 where the liquid ejected from the liquid ejection port 4 flows, a reservoir tank 10 for adjusting an amount of the liquid, a liquid amount adjusting line 11 connecting the reservoir tank 10 to the liquid ejection port 4 of an evaporator of the last position, a control valve 12 controlling an amount of the liquid, and arrows 22 and arrow 23 indicating the liquid flows.

Within the loop formed by the vapor line 5, the condenser 7, the liquid supply line 8, the liquid flow line 9, and the liquid amount adjusting line 11, an uncolored portion shows the vapor flow and a black portion shows the liquid flows.

The evaporators 1 of plural positions, the liquid flow line 9, the liquid amount adjusting line 11, the control valve 12, and the reservoir tank 10 are collectively called a heat absorber.

In this embodiment each evaporator is connected in series and the evaporator of the last position is connected to the reservoir tank 10.

A plurality of vapor lines 5 extended individually from a plurality of evaporators 1 are joined and connected to the condenser 7. The condenser 7 is connected to the liquid supply line 8, which is eventually connected to the evaporator of the first position.

Thus, in the thermal transport system of the present invention, the serial connection permits the plurality of evaporators 1 to share the liquid reservoirs and liquid lines.

In addition, the reservoir tank connected to the evaporator of the last position adjusts an amount of the liquid. The reason for connecting the reservoir tank with the evaporator of the last position is for the reservoir tank to accommodate an excess liquid which the evaporators 1 of the first to the last positions cannot accommodate.

The reason why the invention adopts the serial connection of evaporators 1 is that the serial connection is theoretically more effective in preventing the dry out than the parallel connection.

As explained before, since the capillary force of the parallel connection is limited, when the heating value becomes high, a problem occurs in the system not being able to transfer the liquid smoothly.

Theoretically, as the evaporators 1 of the first position and that of the second position do not cooperate with each other to increase the capillary force, each evaporator needs to transfer the liquid only with its individual capillary attraction.

On the other hand, in the case of serial connection, the capillary forces generated at the evaporator of the second position and that of the third position both contribute to the capillary force of the evaporator of the first position. Thus, the evaporators 1 of the second and the third positions can work like pumps, and the first evaporator can obtain greater capillary attraction than the case of parallel connection.

Therefore, the evaporators 1 of the serial connection can transfer even large amount of the liquid.

Hence, the serial connection is theoretically superior to the parallel connection, and the serial connection can accept higher allowable heating value until dry out than the parallel connection, therefore this invention employs the serial connection of the evaporators 1.

Figure 3:
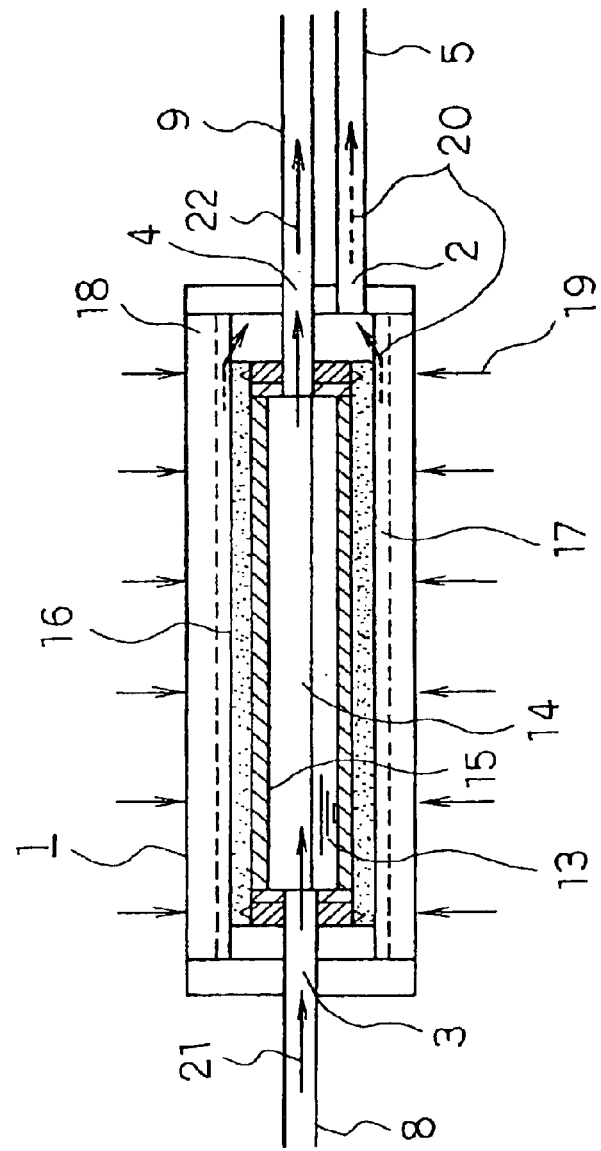
FIG. 3 shows a structure of an evaporator of the present invention.

Next, the evaporator of the present invention is explained. FIG. 3 illustrates a longitudinal section of the evaporator. A description of the numbered components indicated in the figures follows: liquid-phase working fluid 13, a liquid reservoir 14 for accommodating the liquid-phase working fluid, a first wick layer 15 consisting of porous structure, a second wick layer 16 having a pore size different from that of the first wick layer, a vapor channel 17 where the vapor flows, a container 18 of the evaporator, and arrows, 19 indicating the direction of the heat generated at the heat generation unit.

The reason for using two sorts of wick layer is to enhance permeability of the liquid, however even one layer-wick can work.

Next, a function of the evaporator is described.

As the arrows 19 in FIG. 3 indicates, the heat generated at the heat generation unit conducts the container 18 of the evaporator and vaporizes the liquid-phase working fluid 13 which is penetrating the second wick layer 16 by the effect of the capillary force of the first wick layer 15 and the second wick layer 16.

The vaporized working fluid proceeds the vapor channel 17 in the direction parallel to an arrow 20, runs out through the vapor ejection port 2 to the vapor line 5, and reaches the condenser 7 as illustrated in FIG. 1.

The vapor releases the heat and is condensed at the condenser 7. The liquid-phase working fluid 13 flows in the liquid supply line 8 in the direction parallel to the arrow 21, and returns to the evaporator through the liquid supply port 3.

As shown in FIG. 3, a certain amount of the liquid-phase working fluid 13 is accommodated in the liquid reservoir 14 and the rest flows out through the liquid ejection port 4 into the liquid flow line 9.

Next, as an arrow 22 indicates, the liquid flows into the evaporator of the second position. At the evaporator of the second position as well, a certain amount of the liquid is accommodated in its liquid reservoir 14 and the rest flows into the evaporator of the next position.

Accordingly, the liquid reaching the evaporator of the last position is accommodated in the liquid reservoir of the evaporator of the last position.

An excess amount of the liquid which the evaporator of the last position cannot accommodate will be accommodated in the reservoir tank 10 through the liquid amount adjusting line 11.

The reservoir tank 10 adjusts an amount of the liquid flowing through the system, and for this purpose the reservoir tank is connected to the evaporator of the last position.

It is efficient that the liquid reservoir of the last position is larger than the other positions so as to lessen the excess amount of the liquid.

When the amount of liquid in each liquid reservoir becomes insufficient, the control valve 12 operates so as to supply the liquid reserved in the reservoir tank to the evaporator of the last position as the arrow 23 indicates, so that it is possible to increase the amount of liquid in each liquid reservoir by increasing the amount of liquid flowing through the system.

In the case that the heating value remains equal and consumption amount of the liquid in the liquid reservoir 14 is predicted, setting periodical supply of the liquid from the reservoir tank 10 can avoid a shortage of the liquid.

Because of the serial connection of evaporators 1, the system of the present invention is theoretically effective against dry out, as well as being simple in structure and low in manufacturing cost.

The reservoir tank accommodating the excess amount of liquid permits enough distribution of the liquid to secure sufficient amount of the liquid in the liquid reservoir, thus can get rid of a risk of dry out.

Furthermore, since the liquid is supplied from the reservoir tank, this keeps the evaporators 1 to operate properly without dry out.

Embodiment 2.

Figure 4:
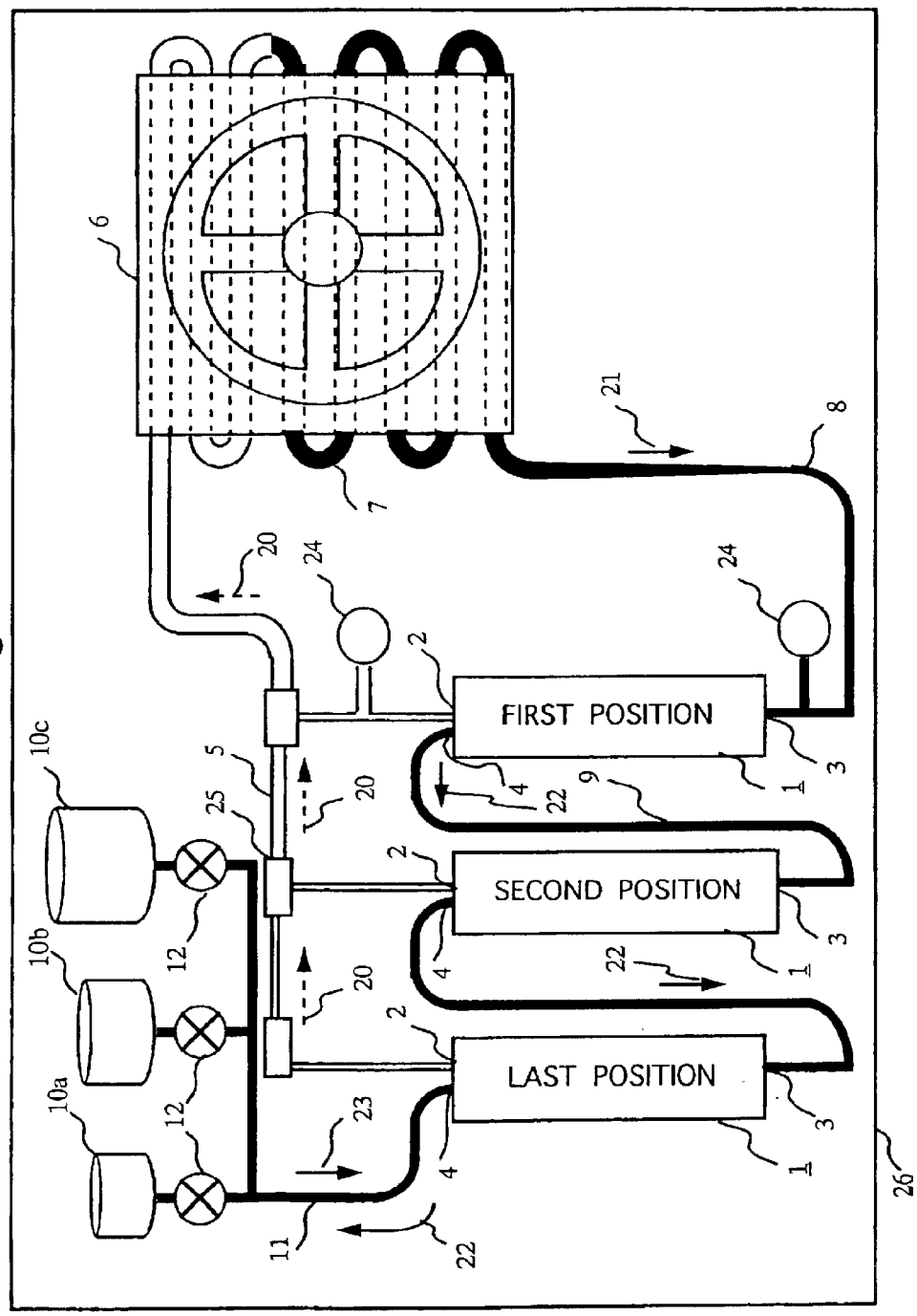
FIG. 4 shows a configuration of the thermal transport system of the present invention.

FIG. 4 illustrates a schematic view of the system of this embodiment.

Description of the numbered components follows: a small-sized reservoir tank 10a, a medium-sized reservoir tank 10b, a large-sized reservoir tank 10c, a liquid amount measuring sensor 24 for measuring the amount of the liquid accommodated in the liquid reservoir, a vapor junction valve 25 for smoothing a junction of vapor flows.

Components 1,2,3,4,5,6,7,8,9,11,12,20,21,22,23, and 26 are same as those in the embodiment 1.

The embodiment 2 introduces different connection pattern of the evaporators 1 from the embodiment 1 in order to give another variation.

The evaporators 1 of plural positions, the liquid flow line 9, the liquid amount adjusting line 11, the control valve 12, and the reservoir tank 10 are collectively called a heat absorber.

The system described in the embodiment 1 suits for an application where a heating value remains unchanged and liquid consumption in the liquid reservoir can be estimated, however, the embodiment 2 refers to an application where a heating value changes so drastically that a frequent adjustment of the liquid supply is required.

When a heating value of the heat generation unit changes suddenly, the system cannot keep an adequate cycle of vaporization→condense→liquid supply→vaporization. Hence, when the heating value increases suddenly, the amount of vaporization exceeds the amount of liquid supply and the liquid reservoir may dry out.

On the other hand, when the heating value decreases suddenly, on the contrary, the liquid reservoir may overflow. Therefore, it is necessary to measure the amount of the liquid in the liquid reservoir all the time and to automatically adjust the amount of liquid in the liquid reservoir in accordance with a measured result.

In this embodiment, the liquid amount measuring sensor 24 measures the amount of the liquid in the liquid reservoir all the time and based on the measured result of the sensor, the liquid accommodated in the reservoir tank is supplied to the system.

Next, an operation of the system is explained.

Firstly, the liquid amount measuring sensor 24 measures the amount of liquid in the liquid reservoir of the evaporator.

In this embodiment, the liquid amount measuring sensor 24 is supposed to be a pressure sensor or a thermal sensor, however any sensor is usable as long as it can measure the amount of liquid in the liquid reservoir.

The reason to use the pressure sensor is that the amount of liquid can be estimated by measuring the liquid pressure. The reason to use the thermal sensor is that the amount of liquid can be estimated by measuring the temperature inside the liquid reservoir. Since the temperature in the liquid reservoir rises when only a small amount of liquid is left in the liquid reservoir by a progress of vaporization, so that the amount of the liquid in the liquid reservoir can be estimated if a relation between the amount of liquid and the temperature is preliminarily investigated.

In this embodiment, the liquid amount measuring sensor is placed so as to measure the amount of the liquid accommodated in the liquid reservoir of the evaporator of the first position. However, the liquid amount measuring sensor can be placed at a choice, depending on a layout of the system. For instance, it is possible to connect the liquid amount measuring sensors with the plurality of evaporators 1, or only with the evaporator of last position.

The measured result of the liquid amount measuring sensor is constantly transmitted to a control unit (not illustrated in FIG. 4). When the control unit detects the amount of liquid to be insufficient, the control unit operates the control valve 12 to supply the liquid in the reservoir tank to the system.

Depending on seriousness of shortage of the liquid, the control unit selects a reservoir tank out of three reservoir tanks, namely; of the small-sized reservoir tank 10a, the medium-sized reservoir tank 10b and the large-sized reservoir tank 10c.

For example, the higher the heating value of the heat generation unit, the more critical the shortage. Therefore, the large-sized reservoir tank 10c must be selected to supply a large amount of liquid.

When the heating value is high, vaporization and liquid consumption per time proceeds rapidly at the evaporators 1, and further at the condenser 7 the vapor is so hot that it takes time to cool down (i.e. the time of being the vapor is long, being the liquid is short), thus the amount of liquid supply per time is insufficient.

Therefore, the liquid reservoir is seriously short of the liquid, so that the large-sized reservoir tank 10c is selected to supply a large amount of the liquid.

Then, the liquid in the reservoir tank flows through the liquid amount adjusting line 11 in the direction parallel to the arrow 23, and the liquid accommodates in the liquid reservoir of the last position. Later, an added liquid is distributed to the liquid reservoirs of other evaporators 1 through the process of vaporizing and condensing.

In this embodiment, the cycle of vaporizing, condensing and the liquid returning to the evaporator is same as that in embodiment 1.

As the system of the present invention measures the amount of the liquid in the liquid reservoir all the time and automatically supplies the liquid accommodated in the reservoir tank, dry out does not take place.

Next, the vapor junction valve is explained.

Figure 7A:
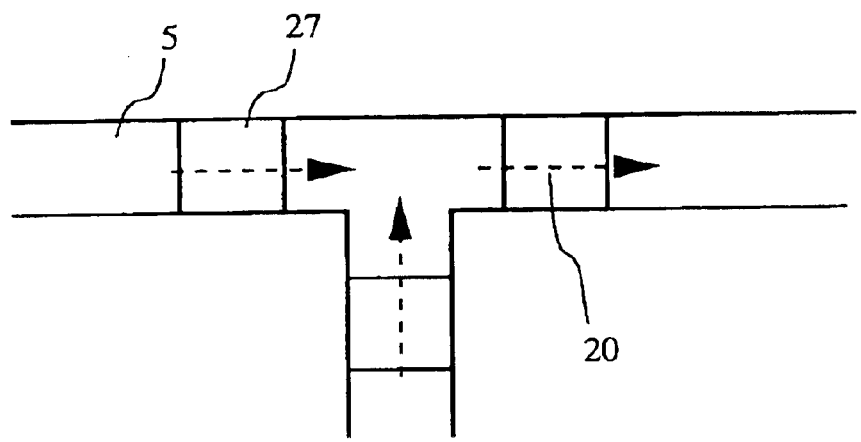
FIG. 7A shows a conventional cross flow valve.
Figure 7B:
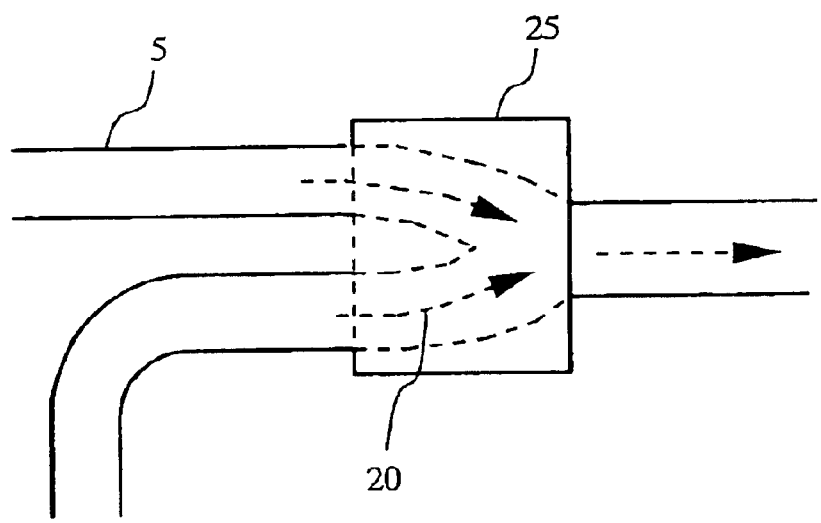
FIG. 7B shows a vapor junction valve of the present invention.

FIG. 7A describes a conventional cross flow valve 27 and its vapor flow 20. FIG. 7B shows the vapor junction valve 25 of the present invention and its vapor flow 20.

In case of using the conventional cross flow valve 27, as vapor flows cross each other, a flooding observed at a junction of vapor flows prevents a smooth vapor flow.

The vapor junction valve 25 of the present invention implements the smooth vapor flow and it also reduces a pressure drop by joining one vapor line with the others at an acute angle towards the direction of vapor junction.

As a result, the vapor junction valve reduces the pressure drop of the whole system and the maximum heat transport capability hence increases.

As shown in FIG. 4. the bore size of the vapor line gradually widens as one vapor line meets the others. The amount of vapor flowing in the vapor line increases as one vapor line joins with the others. Therefore, smooth vapor flow is implemented by broadening the bore size of the vapor line gradually as one vapor line meets the others.

Embodiment 3.

The systems of embodiments 1 and 2 are supposed to be placed horizontally (i.e. in the direction perpendicular to the gravitation), however a modification on the connection of the evaporators 1 enables the system to be placed vertically (i.e. in the direction horizontal to the gravitation).

Figure 5:
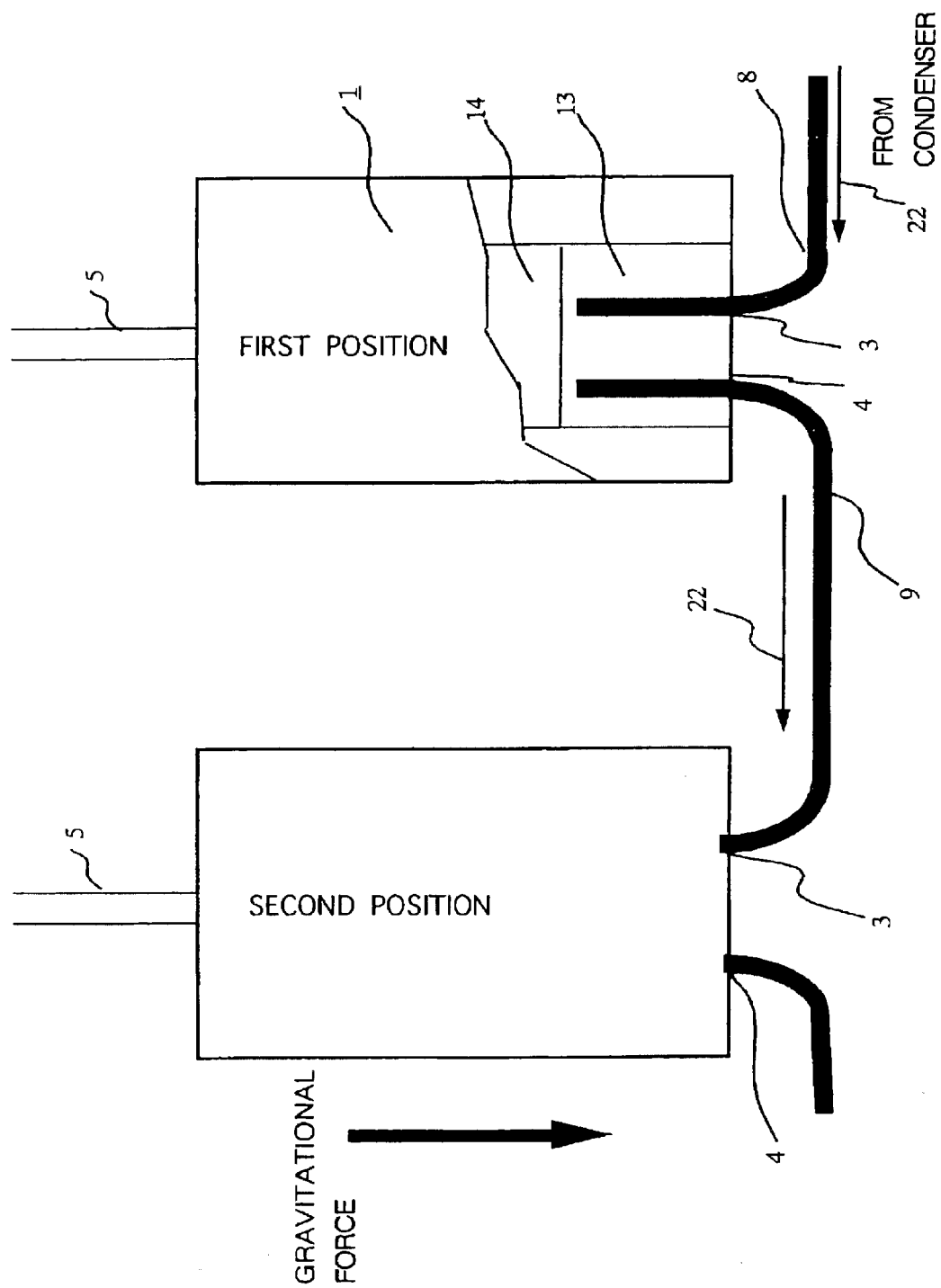
FIG. 5 shows a connection pattern of evaporators 1 of the present invention.

FIG. 5 illustrates the evaporator of the first position cut partially for better understanding, and its simplified internal structure.

The structure and the function of the evaporator of this embodiment are same as in embodiment 1, except for the connection pattern.

The liquid supply port 3 and the liquid ejection port 4 are placed at the lower end of the evaporator. And the liquid ejection port 4 of the evaporator of the first position is connected to the liquid supply port 3 of the evaporator of the second position via the liquid flow line 9.

The level of the liquid must always be higher than the top of both the liquid supply line 8 and the liquid flow line 9.

With this connection pattern, the system can operate, even when it is placed vertically.

Namely, the invention has an advantage of contributing to a flexible system design.

As long as the liquid ejection port 4 of one evaporator is connected to the liquid supply port 3 of the evaporator of the next position, any connection pattern can be taken depending on the system configuration.

Embodiment 4

This embodiment shows an application of the thermal transport system of the present invention for cooling of a motor.

Figure 8A:
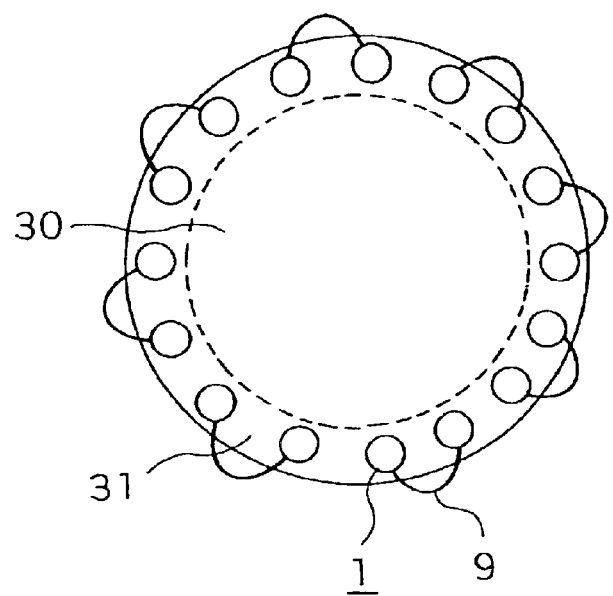
FIG. 8A shows a plan view of a motor applying the thermal transport system of the present invention.
Figure 8B:
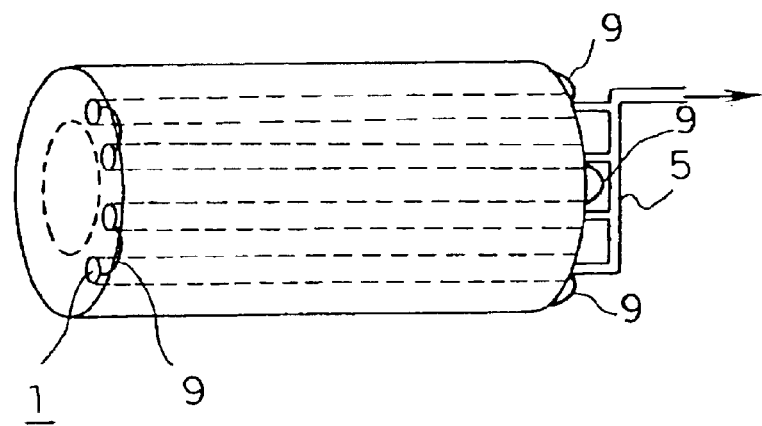
FIG. 8B shows a plan view of a motor applying the thermal transport system of the present invention.

FIG. 8A is a front view of the motor installing the evaporators 1. FIG. 8B is a side view.

In the figures, 30 is the motor, 31 is a motor casing, 1,5, and 9 are same as those in the embodiment 1.

The evaporators 1 inserted into the motor casing are connected to each other via the liquid flow line 9.

Since the evaporator of the last position is connected to the reservoir tank 10 not shown in FIGS. 8A and 8B, it is possible to adjust the amount of the liquid in the liquid reservoir of each evaporator.

The vapor line of each evaporator extending from one end of the motor to the other end of the motor transfers the vapor to the condenser 7 as indicated by an arrow.

Embodiment 5.

This embodiment shows an application of the thermal transport system of the present invention for cooling of an artificial satellite.

Figure 9A:
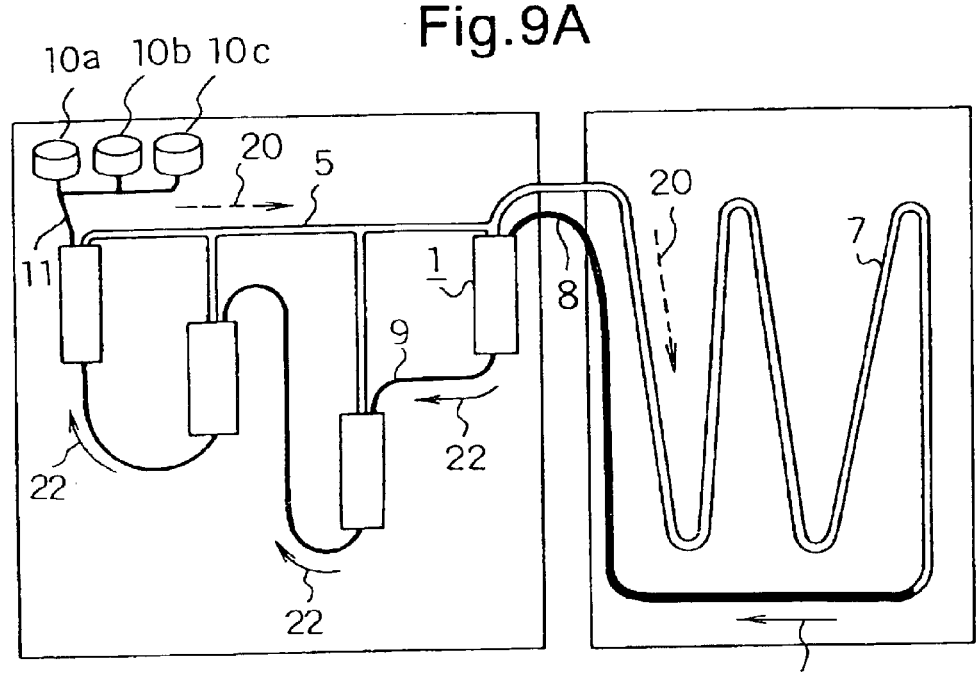
FIG. 9A shows a plan view of an artificial satellite applying the thermal transport system of the present invention.
Figure 9B:
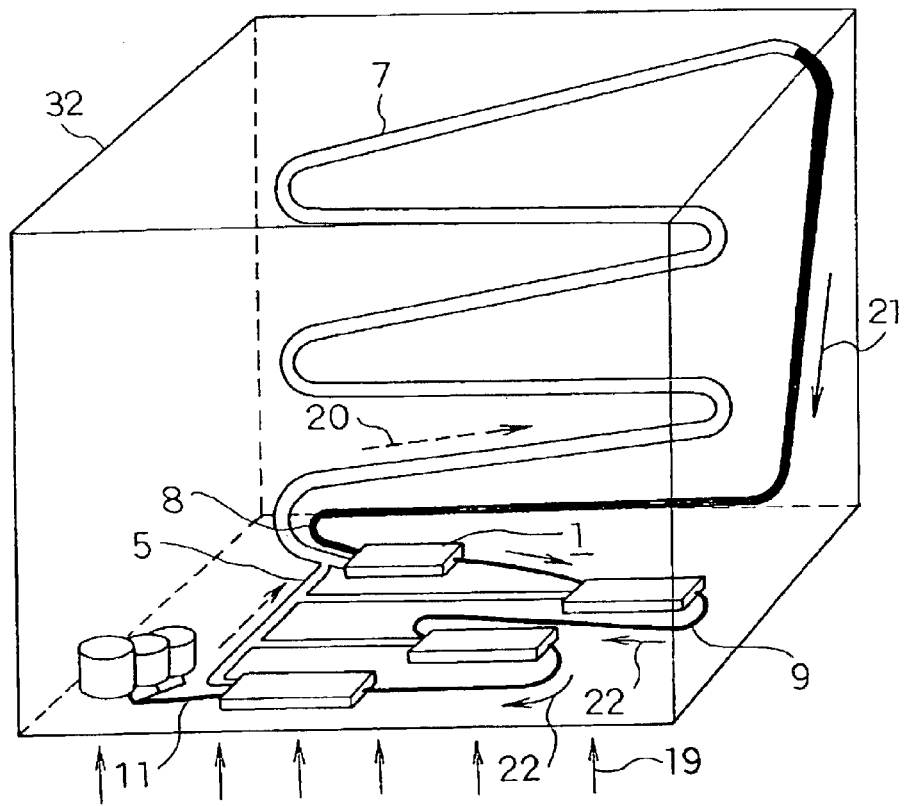
FIG. 9B shows a plan view of an artificial satellite applying the thermal transport system of the present invention.

FIGS. 9A and 9B show schematic views of the artificial satellite installing the thermal transport system.

Components 1,5,7,8,9,11,19,20,21, and 22 are same as those in the embodiment 1.

Components 10a,10b, and 10c are same as those in the embodiment 2.

In FIG. 9B, 32 stands for a chassis of the artificial satellite.

The system in this embodiment is to radiate the heat by placing evaporators 1 on the wall which faces the sun and is heated by the sun as indicated by the arrow 19, and placing the condenser 7 on the wall being in the shade.

The structure and the function of the system are same as those in the embodiment 1.

FIG. 9B illustrates the evaporators 1 on a bottom wall and the condenser 7 on a front wall, however in a practical application the evaporators 1 are both on the upper and bottom walls, and the condensers 7 are both on the front and back walls, thereby installing two thermal transport systems.

Embodiment 6

Figure 10:
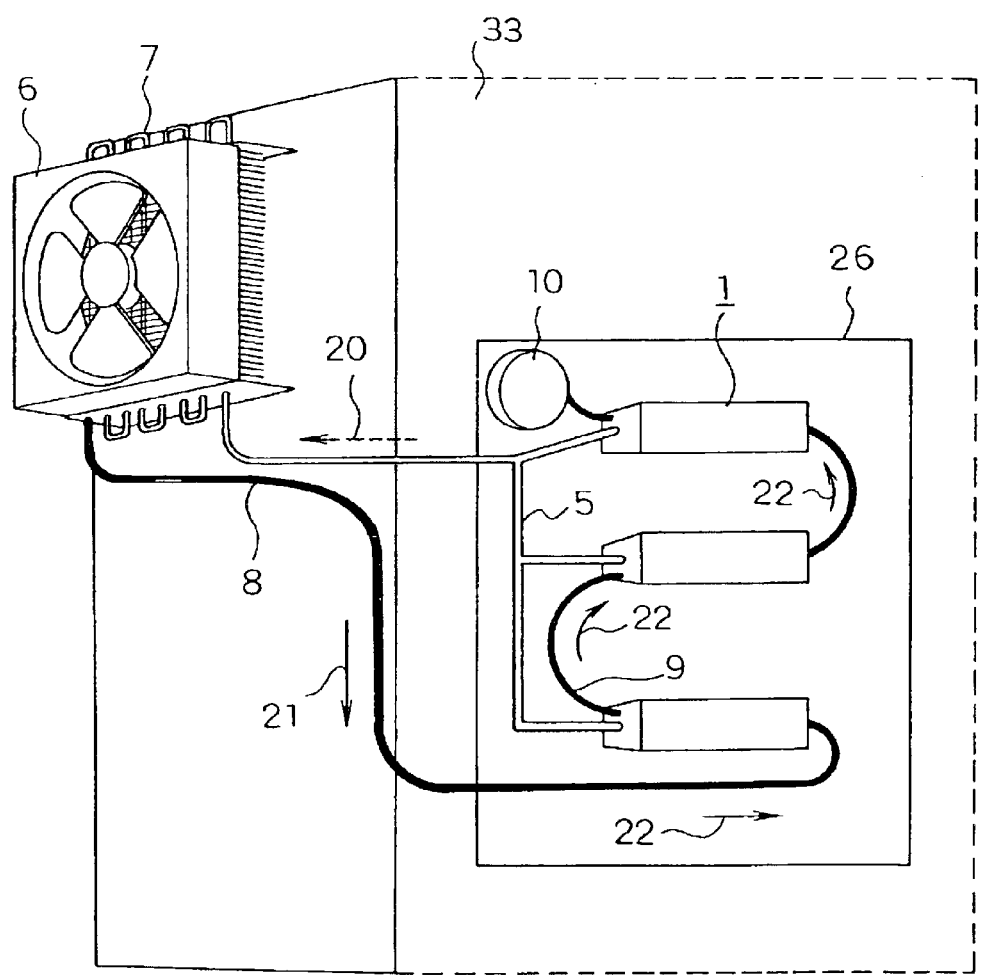
FIG. 10 shows a plan view of a computer applying the thermal transport system of the present invention.

FIG. 10 shows a schematic view of an application of the thermal transport system of the present invention for cooling of a computer.

In FIG. 10, 33 is a chassis of the computer. Components 1,5,7,8,9,11,19,20,21, and 22 are same as those in the embodiment In cases of multi-processor consisting of a plurality of CPUs (Central Processing Unit), it is necessary to place each evaporator above each CPU, and it is possible to apply the thermal transport system of the invention.

A demand to downsize the personal computers especially are strong, such that the system of the present invention is useful in reducing the size and weight of personal computers.

The structure and the function are same as those described in the embodiment 1.

Embodiment 7

Figure 6:
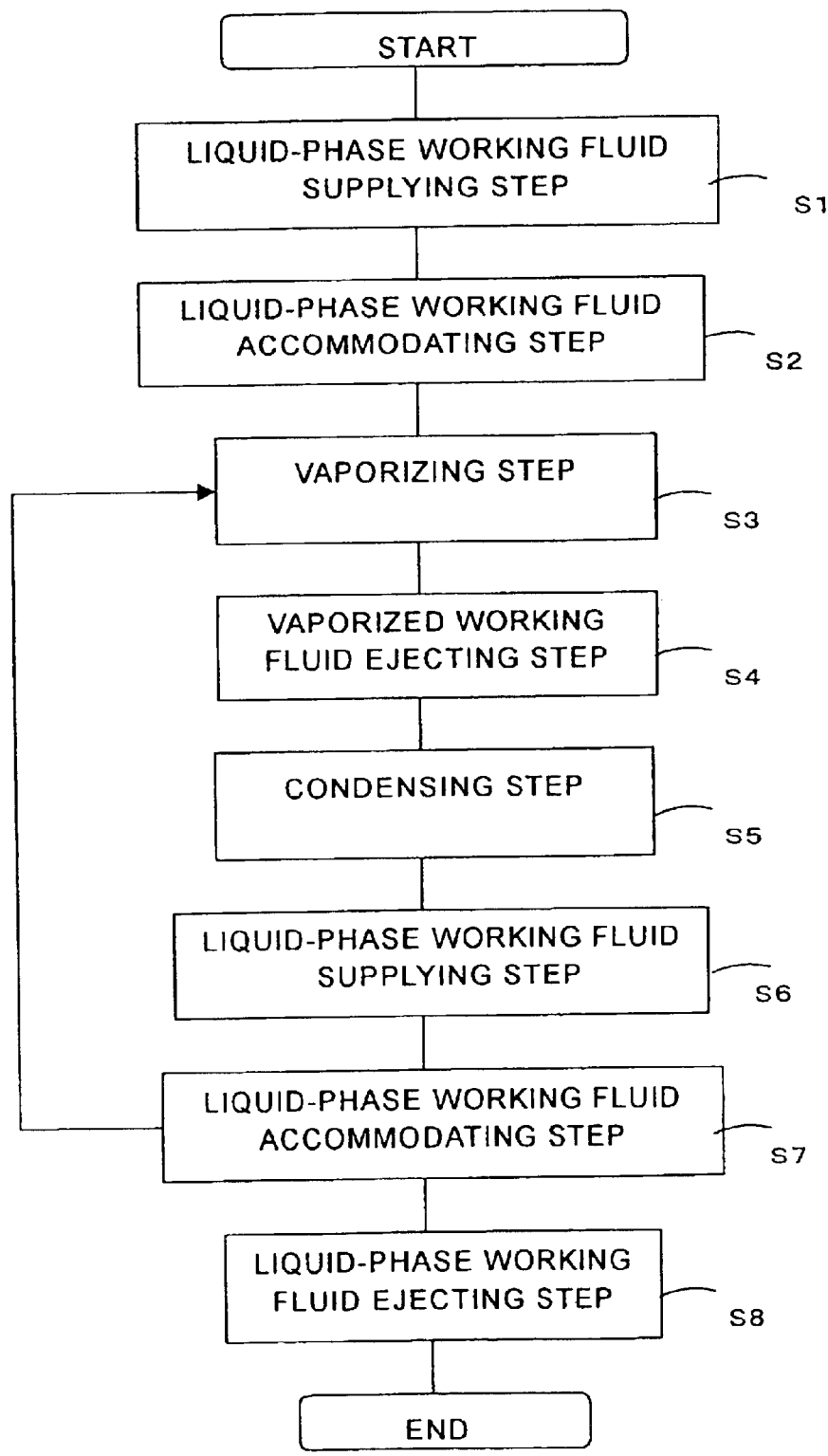
FIG. 6 shows a flow chart of the thermal transport method of the present invention.

FIG. 6 shows a flow chart of a thermal transport method of the present invention, and illustrates same process as that of the thermal transport system explained in the embodiment 1(FIG. 1).

In step S1 liquid-phase working fluid is supplied to an evaporator. In step S2, the supplied liquid is accommodated in the liquid reservoir of the evaporator. In step S3, the liquid is vaporized by heat which the evaporator receives. Then in step S4, the vaporized vapor is ejected from the evaporator. In step S5, the vapor ejected from the evaporator becomes the liquid-phase working fluid by means of condensation and liquefying.

In step S6, the condensed working fluid is supplied to the evaporator again. In step S7, the liquid supplied to the evaporator again is accommodated in the liquid reservoir of the evaporator. While a certain amount of the liquid accommodated in the liquid reservoir proceeds to the liquid ejecting step of S8, the rest moves to the vaporizing step of S3 and repeats the steps S4 to S7. In step S8, a certain amount of the liquid accommodated in the liquid reservoir is ejected from the evaporator.

The thermal transport method is fulfilled with the steps mentioned above.

According to embodiment 1 of the present invention, unlike the conventional system, since the present invention does not need additional devices such as pump for equalizing the liquid supply, extra liquid reservoir, and heater for adjusting pressure, the invention provides an advantage of the configuration being simple, small, lightweight and cost effective.

Besides, the invention enables FLHP to extend its application of cooling in various equipment.

According to embodiment 1 of the present invention, the system of the present invention adopting serial connection of evaporators is theoretically more effective for prevention of dry out than the parallel connection of the prior art.

According to embodiment 1 of the present invention, the reservoir tank accommodating the excess amount of the liquid permits enough distribution of the liquid to secure a sufficient amount of the liquid in the liquid reservoir, thus can get rid of the risk of dry out.

According to embodiment 1 of the present invention, since the reservoir tank supplies the liquid to the liquid reservoirs of the evaporators 1, the evaporators work properly without dry out.

According to embodiment 2 of the present invention, since the system automatically adjusts an amount of the liquid by using the liquid in the reservoir tank based on the measured result of the liquid amount measuring sensor, the present invention effectively prevents the dry out even in the application requiring frequent adjustment of the amount of liquid.

According to embodiment 3 of the present invention, since the system can be set not only horizontally but also vertically, the invention contributes to the flexible system design.

According to embodiment 2 of the present invention, since with the introduction of the vapor junction valve 25, one vapor line joins with the others at an acute angle towards the direction of vapor junction, and it is possible to reduce the pressure drop and achieve a smooth vapor flow. Consequently, the pressure drop of the whole system decreases and hence the maximum heat transport capability increases.

According to embodiment 2 of the present invention, the smooth vapor flow is implemented with the vapor line having the bore size gradually widening as it meets the other vapor lines.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A heat absorber comprising:
   a plurality of evaporators serially connected in different positions for receiving heat generated at heat generation units, wherein each evaporator comprises:
   a) a liquid reservoir for accommodating liquid-phase working fluid;
   b) a liquid supply port for supplying liquid-phase working fluid to the liquid reservoir;
   c) a vapor ejection port for ejecting from the evaporator, working fluid vaporized at the evaporator; and
   d) a liquid ejection port for ejecting from the evaporator, liquid-phase working fluid accommodated in the liquid reservoir;
   a condenser in series with the plurality of evaporators; and
   a reservoir tank connected to an evaporator of the last position of the plurality of evaporators at the liquid ejection port and adapted to receive excess liquid-phase working fluid from the evaporator of the last position when a liquid-phase working fluid level is above a desired level and to supply liquid-phase working fluid to the evaporator of the last position when a liquid-phase working fluid level is below the desired level.

2. The heat absorber according to claim 1, wherein the liquid ejection port of evaporators of the plurality of evaporators excluding the evaporator of the last position is connected to the liquid supply port of an evaporator of the next position of the plurality of evaporators.

3. The heat absorber according to claim 1, wherein a capacity of the liquid reservoir of the evaporator of the last position is larger than a capacity of the liquid reservoir of evaporators of other positions of the plurality of evaporators.

4. The heat absorber according to claim 1, comprising:
   a) a liquid amount measuring sensor for measuring an amount of liquid-phase working fluid accommodated in the liquid reservoir of an evaporator out of the plurality of evaporators; and
   b) a liquid amount controller for controlling by using the reservoir tank, the amount of liquid-phase working fluid accommodated in the liquid reservoir of each evaporator based on measured data of the liquid amount measuring sensor.

5. The heat absorber according to claim 4, wherein the liquid amount measuring sensor measures the amount of liquid-phase working fluid accommodated in the liquid reservoir of the evaporator of the last position only, and the liquid amount controller controls by using the reservoir tank, the amount of liquid-phase working fluid accommodated in the liquid reservoir of each evaporator based on one single measured data of the liquid amount measuring sensor.

6. The heat absorber according to claim 4, wherein the liquid amount measuring sensor measures the amount of liquid-phase working fluid accommodated in the liquid reservoirs of the plurality of evaporators, and the liquid amount controller controls by using the reservoir tank, the amount of liquid-phase working fluid accommodated in the liquid reservoir of each evaporator based on a plurality of measured data of the liquid amount measuring sensor.

7. The heat absorber according to claim 4, wherein the reservoir tank has a plurality of tanks of various size of capacity, and wherein the liquid amount controller controls by using a tank out of the plurality of tanks, the amount of liquid-phase working fluid accommodated in the liquid reservoir of each evaporator based on measured data of the liquid amount measuring sensor.

8. The heat absorber according to claim 4, wherein the liquid amount measuring sensor is one of a temperature sensor and a pressure sensor.

9. A thermal transport system comprising:
  a plurality of evaporators serially connected in different positions for receiving heat generated at heat generation units and a condenser for rejecting heat, wherein each evaporator comprises:
  a) a liquid reservoir for accommodating liquid-phase working fluid;
  b) a liquid supply port for supplying liquid-phase working fluid to the liquid reservoir;
  c) a vapor ejection port for ejecting from the evaporator, working fluid vaporized at the evaporator; and
  d) a liquid ejection port for ejecting from the evaporator, liquid-phase working fluid accommodated in the liquid reservoir;
  a condenser in series with the plurality of evaporators; and
  a reservoir tank connected to an evaporator of the last position of the plurality of evaporators serially connected in different positions at the liquid ejection port and adapted to receive excess liquid-phase working fluid from the evaporator of the last position when a liquid-phase working fluid level is above a desired level and to supply liquid-phase working fluid to the evaporator of the last position when a liquid-phase working fluid level is below the desired level.

10. The heat absorber according to claim 9, wherein the liquid ejection port of evaporators of the plurality of evaporators excluding the evaporator of the last position is connected to the liquid supply port of an evaporator of the next position of the plurality of evaporators.

11. The thermal transport system according to claim 9, wherein a capacity of the liquid reservoir of the evaporator of the last position is larger than a capacity of the liquid reservoir of the evaporator of other positions.

12. The thermal transport system according to claim 9, comprising
  a) a liquid amount measuring sensor for measuring an amount of liquid-phase working fluid accommodated in the liquid reservoir of an evaporator out of the plurality of evaporators; and
  b) a liquid amount controller for controlling by using the reservoir tank, the amount of liquid-phase working fluid accommodated in the liquid reservoir of each evaporator based on measured data of the liquid amount measuring sensor.

13. The thermal transport system according to claim 12, wherein the liquid amount measuring sensor measures the amount of liquid-phase working fluid accommodated in the liquid reservoir of the evaporator of the last position only, and the liquid amount controller controls by using the reservoir tank, the amount of liquid-phase working fluid accommodated in the liquid reservoir of each evaporator based on one single measured data of the liquid amount measuring sensor.

14. The thermal transport system according to claim 12, wherein the liquid amount measuring sensor measures the amount of liquid-phase working fluid accommodated in the liquid reservoirs of the plurality of evaporators, and the liquid amount controller controls by using the reservoir tank, the amount of liquid-phase working fluid accommodated in the liquid reservoir of each evaporator based on a plurality of measured data of the liquid amount measuring sensor.

15. The thermal transport system according to claim 12, wherein the reservoir tank has a plurality of tanks of various size of capacity, and wherein the liquid amount controller controls by using a tank out of the plurality of tanks, the amount of liquid-phase working fluid accommodated in the liquid reservoir of each evaporator based on measured data of the liquid amount measuring sensor.

16. The thermal transport system according to claim 12, wherein the liquid amount measuring sensor is one of a temperature sensor and a pressure sensor.

17. The thermal transport system according to claim 9, wherein each evaporator further comprises a vapor line for supplying vapor vaporized at each evaporator to the condenser, and one vapor line meets with the other vapor lines at acute angle.

18. The thermal transport system according to claim 9, wherein each evaporator-further comprises a vapor line for supplying vapor vaporized at each evaporator to the condenser, and a bore size of the vapor line is widen as one vapor line meets the other vapor line.

19. A heat absorber, comprising:
  a plurality of evaporators serially connected in different positions for receiving heat generated at heat generation units, wherein each evaporator comprises:
  a) a liquid reservoir for accommodating liquid-phase working fluid;
  b) a liquid supply port for supplying substantially only liquid-phase working fluid to the evaporator;
  c) a vapor ejection port for ejecting working fluid vaporized at the evaporator from the evaporator; and
  d) a liquid ejection port for ejecting substantially only liquid-phase working fluid from the evaporator,
  wherein the liquid ejection port of all but a last one of the plurality of evaporators is directly connected to the liquid supply port of a next one of the plurality of evaporators by a liquid line for transporting substantially only the liquid-phase working fluid so that the plurality of evaporators are connected to one another in series by the liquid line.

20. The heat absorber according to claim 19, further comprising a reservoir tank for adjusting an amount of liquid-phase working fluid in the last one of the plurality of evaporators, wherein the liquid ejection port of the last one of the plurality of evaporators is connected to the reservoir tank by the liquid line.

21. A thermal transport system comprising:
  a plurality of evaporators serially connected in different positions for receiving heat generated at heat generation units and a condenser for radiating heat, wherein each evaporator comprises:
  a) a liquid reservoir for accommodating liquid-phase working fluid;
  b) a liquid supply port for supplying substantially only liquid-phase working fluid to the evaporator;
  c) a vapor ejection port for ejecting working fluid vaporized at the evaporator from the evaporator; and
  d) a liquid ejection port for ejecting substantially only liquid-phase working fluid from the evaporator, wherein the liquid ejection port of all but a last one of the plurality of evaporators is directly connected to the liquid supply port of a next one of the plurality of evaporators by a liquid line for transporting substantially only the liquid-phase working fluid so that the plurality of evaporators are connected to one another in series by the liquid line.

22. The thermal transport system according to claim 21, further comprising a reservoir tank for adjusting an amount of liquid-phase working fluid in the last one of the plurality of evaporators, wherein the liquid ejection port of the last one of the plurality of evaporators is connected to the reservoir tank by the liquid line.

23. A thermal transport method using a plurality of evaporators serially connected in different positions for receiving heat generated at a heat generation unit, comprising the steps of:

a) supplying substantially only liquid-phase working fluid to each evaporator of the plurality of evaporators;

b) accommodating, in each evaporator of the plurality of evaporators, liquid-phase working fluid supplied to each evaporator of the plurality of evaporators during the supplying step;

c) ejecting working fluid vaporized at each evaporator of the plurality of evaporators from a vapor ejection port of each evaporator of the plurality of evaporators;

d) ejecting from a liquid ejection port of each evaporator of the plurality of evaporators substantially only liquid-phase working fluid supplied to each evaporator of the plurality of evaporators during the supplying step and accommodated by each evaporator of the plurality of evaporators during the accommodating step;

condensing working fluid vaporized by the plurality of evaporators in a condenser;

receiving excess liquid-phase working fluid from a last evaporator of the plurality of evaporators in a reservoir tank connected to the last evaporator at a liquid ejection port thereof when a liquid-phase working fluid level is above a desired level; and supplying liquid-phase working fluid to the last evaporator from the reservoir when a liquid-phase working fluid level is below the desired level.

\* \* \* \* \*